United States Patent [19]

Landy

[11] Patent Number: 4,864,732
[45] Date of Patent: Sep. 12, 1989

[54] COMBINED HOLE SIZE GAUGE AND OVERSIZED HOLE MARKER

[75] Inventor: Michael A. Landy, Bellevue, Wash.

[73] Assignee: Fatigue Technology, Inc., Seattle, Wash.

[21] Appl. No.: 145,829

[22] Filed: Jan. 19, 1988

[51] Int. Cl.⁴ .................................................. G01B 3/26
[52] U.S. Cl. ..................................... 33/178 B; 33/666; 33/670; 33/574
[58] Field of Search ............ 33/178 B, 178 R, 168 R, 33/666, 668-671, 677-679, 574, 1 BB, 501

[56] References Cited

U.S. PATENT DOCUMENTS

| | | | |
|---|---|---|---|
| 1,671,341 | 5/1928 | Brown | 33/678 |
| 2,000,535 | 5/1935 | Peisch | 33/178 B |
| 2,517,319 | 8/1950 | Jenkin | 33/178 B |
| 2,730,809 | 1/1956 | Selman | 33/178 B |
| 2,792,634 | 5/1957 | Howe et al. | 33/178 B |
| 2,907,111 | 10/1959 | Calkins | 33/178 |
| 2,908,085 | 10/1959 | Price et al. | 33/178 |
| 2,915,830 | 12/1959 | Price | 33/178 |
| 2,920,396 | 1/1960 | Fredd | 33/178 |
| 2,925,660 | 2/1960 | Raulins | 33/178 |
| 3,019,762 | 2/1962 | Hautz | 33/574 |
| 3,407,509 | 10/1968 | Martinez | 33/666 |
| 4,299,033 | 11/1981 | Kinley et al. | 33/178 |
| 4,407,157 | 10/1983 | Lichtenberg | 73/151 |
| 4,420,889 | 12/1983 | Possati et al. | 33/178 |
| 4,427,061 | 1/1984 | Moore | 166/113 |

Primary Examiner—William A. Cuchlinski, Jr.
Assistant Examiner—Patrick R. Scanlon
Attorney, Agent, or Firm—Delbert J. Barnard

[57] ABSTRACT

A combined hole size gauge and oversized hole marker having either first and second sensing members (42, 44) or a single dimensionally graduated size sensing member (14) which when inserted into a hole (40) in a workpiece (38) allows the user to determine whether the hole is of at least minimum size and if it is of greater than maximum size. If the hole is oversized, a marker adjacent the oversized hole size sensing member (44) or the greater portion of the single dimensionally graduated size sensing member (18) is permitted to contact the workpiece (38) and leave an indication that the corresponding hole is oversized.

16 Claims, 2 Drawing Sheets

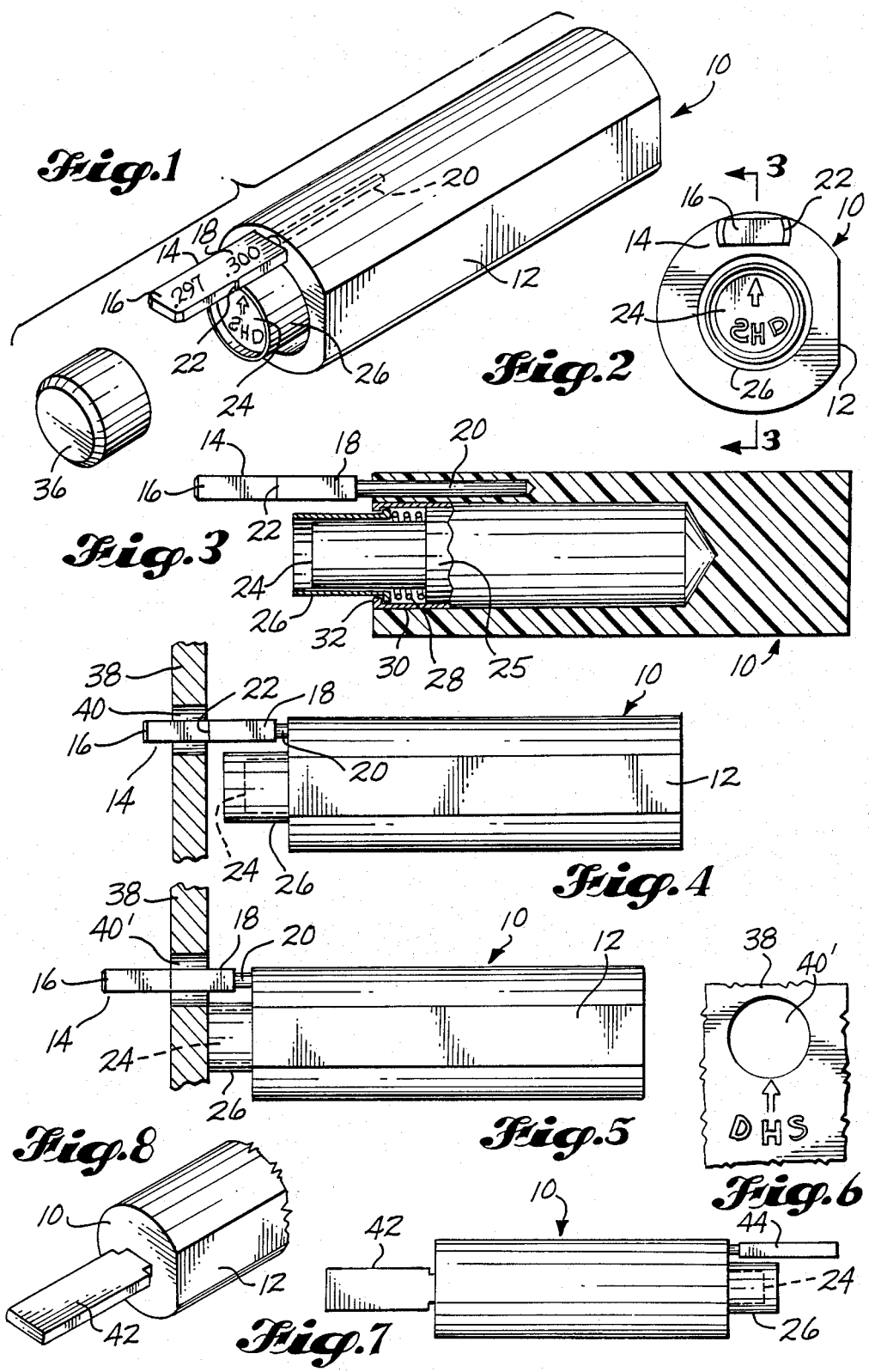

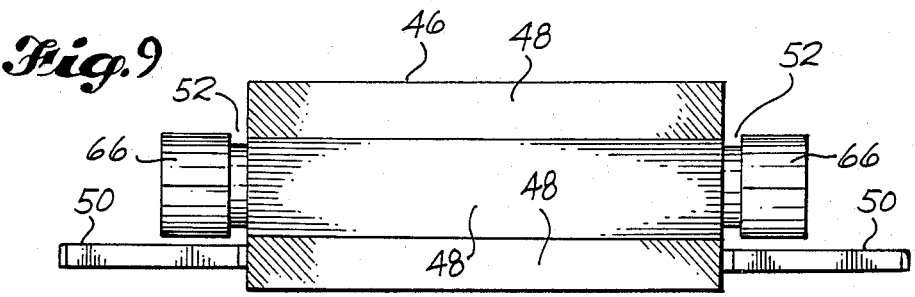
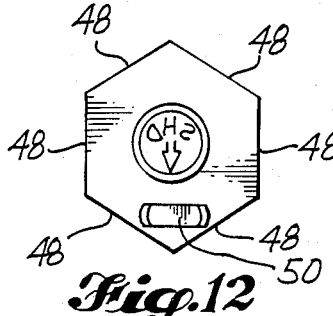
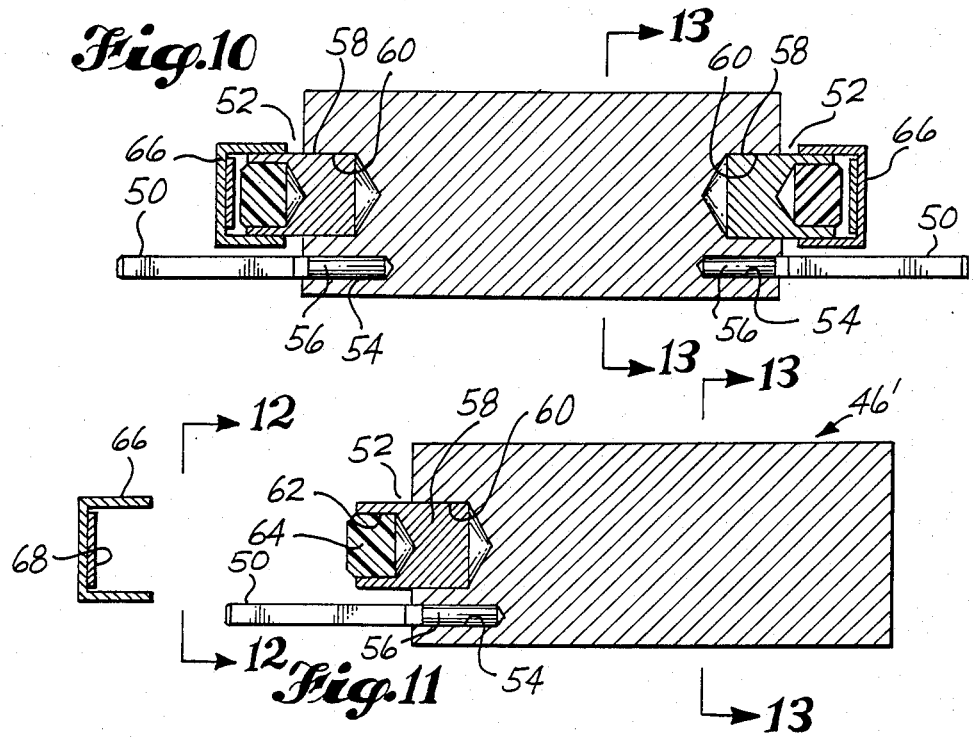
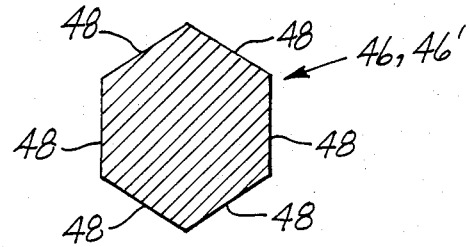
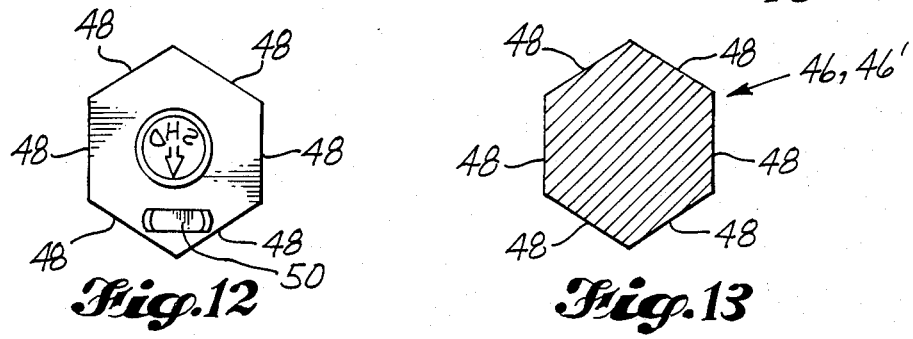

COMBINED HOLE SIZE GAUGE AND OVERSIZED HOLE MARKER

TECNICAL FIELD

This invention relates to devices for gauging the inside diameter of a hole, and particularly to a gauge which includes a marker for marking an oversized hole.

BACKGROUND ART

Many commercial applications require precise gauging of holes in a workpiece through which fasteners or other working members are inserted. It is known in the art that when precision of 1/1000th inch is required, such dimensions cannot be gauged by the human eye. It is desirable to have a hand-held, simple to use device which will gauge with the required precision and reduce the level of potential human error imposed by its use. When a multitude of holes are presented in a workpiece, an efficient method for gauging each hole and accurately marking each hole which will require an oversized fastener or other working member is necessary. An example of such an application is where fastener holes in a structural member are coldworked or internally prestressed to offset or mitigate the stress concentrations which fatigue such members. Because coldworking makes no visibly significant change to the workpiece, each such hole must be gauged to determine whether a hole was missed, and therefore undersized, or overworked, and therefore oversized.

The prior means known in the art uses separate undersize and oversize gauges and a separate marking device which is time inefficient and error proned. When it is important that each and every one of a plurality of holes presented to a worker be properly gauged and that any holes which require marking are done so accurately, use of the present invention for such gauging and marking greatly reduces the potential for human error.

DISCLOSURE OF THE INVENTION

The present invention provides a hand-held device which may be used to gauge the inside diameter of holes formed in a workpiece and to automatically provide a mark on the workpiece indicating any such hole which may be oversized in diameter. A combined hole size gauge and oversized hole marker may be made having a body and first and second size sensing members extending from the body. A marking means is mounted to the body adjacent to the second size sensing member. The first size sensing member is sized to move into a hole formed in a workpiece only if the hole is of at least minimum size. The second size sensing member is sized to move into a hole formed in a workpiece only if the hole is of greater size than the maximum size. The marking means is positioned to contact the workpiece if the hole is oversized and the second size sensing member moves into the hole. Because the device is simple in design, it is resistant to on-the-job damage and is relatively inexpensive to manufacture. Because it is simple in function, likelihood of human error in its use is greatly reduced.

The size sensing members may be mounted separately as first and second size sensing members or as a single dimensionally graduated size sensing member. When a single dimensionally graduated sizing member is inserted into a hole in a workpiece, a distal portion of the member is sized so as to only fit within holes which are of at least the minimum size. A proximal portion of the single dimensionally graduated sizing member is sized such that it will move into a hole in a workpiece only when that hole is oversized. In such an embodiment the marking means is mounted adjacent the sizing member such that it will only contact and mark the workpiece if the proximal, oversized portion of the member is moved into the hole.

According to one aspect of the invention the sizing member or probe may be in the form of a flattened tongue piece having a precisely milled width and curved sides such that the marking means may be located closely adjacent thereto and leave its mark on the workpiece closely adjacent to a gauged hole. Another aspect of the invention is that it may be made with a flattened portion formed in the body or handle member to prevent undesired rolling when the device is not in use.

According to another aspect of the invention, the marking means may be a self-inking stamp mounted in and extending from the body adjacent the oversized hole sensing member. In a preferred embodiment, a spring loaded shield extends beyond the face of the stamp to prevent inadvertent marking. The shield will retract allowing the stamp to mark the workpiece when perpendicular contact is made with the workpiece. Or, the body may have multiple flat sides.

BRIEF DESCRIPTION OF THE DRAWING

In the drawings, which accompany the descsription of the invention presented herein, like reference numerals and letters refer to like parts throughout the various views, and wherein:

FIG. 1 is a pictorial view of a preferred embodiment of the invention, showing a cap for the protective shield spaced out from the shield;

FIG. 2 is an end view of the preferred embodiment of the invention, showing the location of the size sensing member and the marking stamp;

FIG. 3 is a cross sectional view taken along line 3—3 of FIG. 2;

FIG. 4 is a view of the invention in use with the size sensing member inserted into a hole of correct size;

FIG. 5 is a view of the invention in use with the size sensing member inserted into an oversized hole, showing the marker making a mark on the workpiece;

FIG. 6 is a view of a portion of workpiece including an oversized hole showing the mark that was stamped onto the workpiece;

FIG. 7 is a side view of an alternate embodiment of the invention; and

FIG. 8 is a fragmentary pictorial view showing the alternate embodiment of the invention.

FIG. 9 is a side elevational view of an embodiment which has an indicia stamp at each of its ends, such view showing a removable cap installed onto an outer end portion of each stamp element;

FIG. 10 is a longitudinal sectional view of the embodiment shown by FIG. 9, with the size sensing members or probes shown in elevation;

FIG. 11 is a view like FIG. 10, but of an embodiment having a single indicia stamp and hole sizing probe, with the cap for the stamp unit being shown exploded away from its intalled position;

FIG. 12 is an end elevational view taken from the aspect of line 12—12 of FIG. 11; and FIG. 13 is a cross-sectional view taken substantially along line 13—13 of either FIG. 10 or FIG. 11.

BEST MODE FOR CARRYING OUT THE INVENTION

Referring now to the drawings, and first to FIG. 1, therein is shown a combined hole size gauge and oversized hole marker constructed in accordance with a preferred embodiment of the invention. The body 10 is shown here having the general shape of a cylinder with a flattened portion 12 to prevent rolling of the device when it is not in use. The body 10 may be made in any shape conducive to comfortably being held in the hand and may be molded or milled from any suitable material such as plastic or aluminum.

Mounted to the body 10 is a dimensionally graduated size sensing member or probe 14 having portions which are distal 16 and proximal 18 to the body 10. The sizing member 14 may also have a tang portion 20 extending therefrom which may be inserted or embedded into the body 10 for rigid attachment. The size sensing member of this embodiment also has a shoulder 22 between the proximal 18 and distal 16 portions.

Immediately adjacent to the size sensing member 14 is a self-inking stamp 24 having a fluid ink reservoir 25 enclosed within the stamp casing 30 which are together received within the body 10. Self-inking stamps of this type are per se commonly known in the art. In this embodiment, the stamp 24 is protected from inadvertent contact by a reciprocating shield 26 which surrounds the stamp 24 and is outwardly biased from the body 10 by a coil spring 28, as shown in FIG. 3. The stamp casing 30 guides the movement of the shield 26 towards and away from a perpendicularly contacted workpiece 38. An internal flange 32 of the stamp casing 30 engages with an external flange 34 of the shield 26 to restrict outward movement of the shield 26 by the spring 28. A cap 36 may also be placed over the shield 26 and stamp 24 to prevent damage and drying when the device is not in use. Any other suitable marking means which would, upon contact with a workpiece leave an indicative mark, could be used.

In preferred form, the size sensing member is milled from a wear-resistant metal to the precise dimension required. The sizing member should be formed from a material harder than the work piece so that continued use will not cause wear beyond required tolerances. In order to allow the marking means to be located closely adjacent to the sizing member, the sizing member may be in the form of a flattened tongue piece having a precisely milled width and curved sides with a radius equal to one half the width of the member. The method of milling such a member is well-known in the art.

Referring now to FIG. 4, when the device is in use, the size sensing member 14 is placed perpendicular to a workpiece 38 over a hole 40 formed therein. The distal portion 16 of the size sensing member 14 is precision milled to be of sufficient width or diameter not to pass within a hole 40 which may be undersized in diameter. In a hole 40 of proper diameter, the distal portion 16 of the size sensing member 14 will pass within the hole 40 to the point of the shoulder 22 which is between the smaller distal portion 16 and the larger proximal portion 18. The shoulder 22 acts as a stop 40 to prevent the stamp 24 from contacting the workpiece 38.

As shown in FIG. 5, when the size sensing member 14 is inserted into an oversized hole 40' in a workpiece 38, the proximal portion 18 is permitted to pass within the hole 40' allowing the stamp 24 to contact and mark the workpiece 38. FIG. 5 shows the shield 26 in its retracted position.

FIG. 6 shows the stamp imprint on a portion of the workpiece 38 adjacent an oversize hole. Preferably the imprint includes indicia such as a line or arrow pointing towards the oversize hole 40'. This feature is important when the workpiece includes a plurality of closely spaced holes.

An alternative embodiment of the invention is shown in FIGS. 7 and 8. In this embodiment, a first size sensing member 42 extends from one part of the body 10. The first size sensing member 42 is inserted into a hole 40 formed in a workpiece 38 to determine whether the hole 40 is of at least minimum size. The second size sensing member 44 may also be inserted into a hole 40 formed in a workpiece 38 to determine whether the hole 40 is oversized. If the hole 40 is oversized, the second size sensing member 44 will pass therein and allow the adjacent stamp 24 to contact and mark the workpiece 38. In another embodiment (not shown), the undersize gauge 42 is omitted. In other respects the tool is like the tool shown in FIG. 7. It includes the oversize gauge 44 and the stamp 24.

The embodiment shown by FIGS. 9, 10, 12 and 13 comprises a multiple sided body or handle 46, e.g. six sided as shown in FIGS. 12 and 13. This shape provides a comfortable handle and provides a flat surface 48 towards any support surface on which the tool is placed.

The embodiment shown by FIGS. 11-13 is like the embodiment shown by FIGS. 9, 10, 12 and 13 except that it has a hole size gauge 50 and stamp unit 52 at only one end. The embodiment shown by FIGS. 9, 10, 12 and 13 has a hole size gauge or probe 50 and a stamp unit 52 at each of its ends. The two probes 50 may be identical in size so that the same function can be performed by both ends of the tool. Or, the probes may be different in size, i.e. be sized to fit into different diameter openings.

As before, an axial socket 54 is formed into the end of the body 46, 46' for receiving an anchoring end portion 56 of the probe 50. In a six sided embodiment of body or handle 46, 46', the socket 54 is located in a point region of the body 46, 46' where the radial dimension is greater than in a flat region (see FIG. 12).

In the embodiment shown by FIGS. 9-13, the stamp units comprise stamp element holders 58, each of which is sized to be inserted into a blind bore 60 formed in an end portion of the body or handle 46, 46'. The stamp holder 58 has a blind bore 62 (FIG. 11) at its outer end into which a stamp element 64 is inserted. Stamp element 64 is constructed from a suitable stamp material, e.g. rubber, plastic, etc. Each stamp element 64 presents indicia at its outer end (FIG. 12) which is imprinted onto material adjacent a hole through which the probe 50 can fit.

Each stamp unit 52 preferably also includes a protective cap 66 which frictionally fits on the portion of the stamp element holder 58 which projects endwise out from the body or handle 46, 46'. Each cap 66 may include a pad 68. Pad 68 may be an ink pad such that insertion of the cap 66 and movement of the pad 68 into contact with the outer end of the stamp element 64 can be used for applying ink to the imprinting portion of the stamp element 64. Or, stamp element 64 may be a self-inked element and the pad 68 may be provided for absorbing excess ink so that the tool will not leak ink when not in use.

The body or handle 46, 46' and the stamp element holders 58 and the caps 66 may be constructed from metal or a suitable structural plastic.

The embodiments which are illustrated and described are provided as examples of the invention. The patent coverage is not to be limited by the disclosed specifics of these examples, but only by the claims which follow, interpreted in accordance with established rules of patent claim interpretation, including use of the doctrine of equivalents.

What is claimed is:

1. A combined hole size gauge and oversized hole marker, comprising:
   a body member,
   first and second size sensing members extending from said body member,
   a marking means mounted to said body member adjacent to said second size sensing member,
   wherein the first size sensing member is sized to move into a hole formed in a workpiece only if the hole is of at least minimum size and the second size sensing member is sized to move into the hole only if the hole is of greater size than the maximum size, and the marking means is positioned to contact the workpiece if the hole is oversized and the second size sensing member moves into the hole.

2. The combined size gauge and marker of claim 1, wherein said marking means is a stamp which delivers a fluid ink to the surface of the workpiece.

3. The combined size gauge and marker of claim 2, wherein said stamp is engraved with message conveying indicia.

4. The combined size gauge and marker of claim 2, wherein the second size sensing member is flat and has a side surface contiguous the marker.

5. The combined hole size gauge and oversized hole marker of claim 1, wherein the body member has a flat side of sufficient width to prevent the gauge from rolling when laid down on a surface.

6. A combined hole size gauge and oversized hole marker, comprising:
   a body member,
   a size sensing member extending from said body member, said size sensing member having portions distal and proximal to said body member, said distal portion being of a lesser width than said proximal portion,
   a marking means mounted to said body member adjacent to said size sensing member,
   wherein the size sensing member may be inserted into a hole formed in a workpiece, and when said hole is of a size to allow only the distal portion to pass through, the marking means will not contact the workpiece, and when said hole is of a size to allow both the distal and proximal portions of the size sensing member to pass through, the marking means will contact and mark the workpiece.

7. The combined size gauge and marker of claim 6, wherein said size sensing member has a shoulder formed between said proximal and distal regions.

8. The combined size gauge and marker of claim 6, wherein said marking means is a stamp which delivers a fluid ink to the surface of the workpiece.

9. The combined size gauge and marker of claim 8, wherein said stamp is engraved with a message conveying indicia.

10. A combined hole size gauge and oversized hole marker, comprising:
    a handle,
    an oversize sensing probe extending endwise outwardly from one end of the handle, said probe being sized to be larger than a properly sized hole so that it cannot be moved into a hole that is properly sized or smaller,
    a stamp marker incorporated into the handle and having a mark making end at the same end of the handle as the probe, positioned closely adjacent the probe,
    wherein in use the probe is moved endwise towards a hole and if the hole is oversized the probe will move through the hole a distance sufficient to bring the mark making end of the stamp into contact with the workpiece, to place a marking indicia on the workpiece marking the hole as being oversize.

11. The combined size gauge and marker of claim 10, wherein the probe is made from flat bar material and its width dimension is the gauge dimension, and said mark making end portion of the stamp is positioned closely adjacent a side surface of the probe.

12. The combined size gauge and marker of claim 10, wherein the handle is partially rounded in cross section and has a flat side surface to prevent it from rolling when set down on a support surface.

13. The combined size gauge and marker of claim 10 wherein the marker is a self-inking stamp.

14. The combined size gauge marker of claim 10 wherein the mark making portion of the marker includes a mark pointing towards the probe, so that when a mark is made on a workpiece next to an oversize hole the mark will point to the oversize hole.

15. The combined size gauge and marker of claim 10, wherein the handle has at least one flat side that is mateable with a flat support surface, to prevent it from rolling when set down on a support surface.

16. The combined size gauge and marker of claim 10, wherein the stamp marker comprises a stamp element holder having inner and outer ends and a socket in its outer end, and a stamp member in said socket having a mark making outer end projecting from said holder, and said handle has a socket in its end in which the inner end portion of the holder is received.

* * * * *